United States Patent [19]

Aonuma et al.

[11] Patent Number: 4,996,264

[45] Date of Patent: Feb. 26, 1991

[54] THERMOPLASTIC AND ELASTOMERIC COMPOSITION

[75] Inventors: Mitsuyoshi Aonuma, Tokyo; Tatsunosuke Suzuki, Warabi; Satoru Isomura; Koichi Nishimura, both of Yokohama, all of Japan

[73] Assignee: Nippon Zeon Co., Ltd., Tokyo, Japan

[21] Appl. No.: 235,863

[22] Filed: Aug. 23, 1988

[30] Foreign Application Priority Data

Aug. 24, 1987 [JP] Japan ................................ 62-209488

[51] Int. Cl.$^5$ ............................................. C08L 77/00
[52] U.S. Cl. ..................................... 525/179; 525/183
[58] Field of Search ................................ 525/179, 183

[56] References Cited

U.S. PATENT DOCUMENTS

| 4,307,207 | 12/1981 | Wiggins et al. | 525/66 |
|---|---|---|---|
| 4,356,286 | 10/1982 | Bethea et al. | 525/183 |
| 4,474,927 | 10/1984 | Novak | 525/66 |
| 4,567,235 | 1/1986 | Sasaki et al. | 525/113 |
| 4,661,563 | 4/1987 | Sasaki et al. | 525/179 |
| 4,803,247 | 2/1989 | Altman et al. | 525/66 |

*Primary Examiner*—Ana L. Carrillo
*Attorney, Agent, or Firm*—Armstrong, Nikaido, Marmelstein, Kubovcik & Murray

[57] ABSTRACT

A thermoplastic and elastomeric composition comprising a polyamide resin and a rubber component, wherein the rubber component is dispersed in the form of crosslinked particles in the polyamide resin.

6 Claims, No Drawings

THERMOPLASTIC AND ELASTOMERIC COMPOSITION

BACKGROUND OF THE INVENTION

The present invention relates to a thermoplastic and elastomeric composition and more particularly to a thermoplastic and elastomeric composition having high fracture resistances and suitable for use in the preparation of flexible parts such as a hose having excellent heat resistance, ozone resistance, oil resistance, etc.

In recent years, with respect to a rubber hose for automobiles, such as a fuel hose in contact with gasoline, studies have been made on the use of a polyamide resin hose for the purpose of improving the durability and reducing the weight and the cost. However, as opposed to the rubber hose, the polyamide hose is poor in the flexibility and large in the tension set, and in addition the polyamide resin is very poor in the resistance to the propagation of cracking and causes brittle fracture rather than ductile fracture, which makes it difficult to widely use the polyamide hose.

Attempts have been made at eliminating the above-described problem through addition of a plasticizer to the polyamide resin, conversion of the polyamide into a block copolymer comprising a polyether as a soft segment, and modification of the polyamide resin by blending of rubber with the polyamide resin. However, the addition of a plasticizer for eliminating the above-described problem causes the flexibility to be spoiled due to vaporization of the plasticizer through the action of heat and extraction of the plasticizer with an oil, which brings about a problem with respect to practical use. The conversion into a block copolymer brings about a lowering in the softening point, which renders the copolymer unsuitable for applications under high temperature conditions.

With respect to the modification of the polyamide resin by blending of the polyamide resin with rubber, proposals have been made on the blending by taking into consideration applications such as a fuel hose in contact with gasoline, and examples of these proposals include dynamic vulcanization blending of nitrile rubber (see U.S. Pat. No. 4,173,556), dynamic vulcanization blending of hydrin rubber (see U.S. Pat. No. 4,297,453), dynamic vulcanization blending of acrylic copolymer rubber (see U.S. Pat. No. 4,310,638), and dynamic vulcanization blending of nitrile rubber and hydrin rubber (see U.S. Pat. Nos. 4,661,563, 4,567,238, and 4,567,235). However, all of these methods have a drawback that the above-described blends are poor in the resistance to sour gasoline (gasoline containing a peroxide formed by the oxidation of gasoline), alcohol-mixed gasoline (gasohol), and sour alcohol-mixed gasoline (sour gasohol) which raised a problem in recent years.

SUMMARY OF THE INVENTION

An object of the present invention is to provide a thermoplastic and elastomeric composition having excellent fracture resistances such as excellent heat resistance, ozone resistance, oil resistance, gasoline resistance, sour gasoline resistance, and sour gasohol resistance.

The above-described object can be attained by a thermoplastic and elastomeric composition comprising a polyamide resin and a rubber component composed of a nitrile group-containing rubber and an acrylic rubber, wherein said rubber component is dispersed in the form of a crosslinked rubber particle in said polyamide resin. The term "elastomeric" used herein is intended to mean such a property that when a sample is stretched at room temperature to 150% (1.5-fold) of the original length, maintained in a stretched state for 10 min and then subjected to release of the stretching, the length of the sample returns to 130% (1.3-fold) of the original value within 30 min after the release.

This and other objects will be apparent from the following detailed description.

DETAILED DESCRIPTION OF THE PREFERRED EMBODIMENTS (1) Polyamide resin

The polyamide resin used in the present invention includes a homopolymer resin, a copolymer resin and a multicomponent copolymer resin each having repeating amide bond units in its polymer chain. These resins are high molecular crystalline or glassy polymer resins. Examples of the polyamide resin include polycaprolactam (nylon-6), polylaurollactam (nylon-12), polyhexamethyleneadipamide (nylon-6,6), polyhexamethyleneazelamide (nylon-6,9), polyhexamethylenesebacamide (nylon-6,10), polyhexamethyleneisophthalamide (nylon-6,IP), polyaminoundecanoic acid (nylon-11), and co-polymers of caprolactam, hexamethylenediamine and adipic acid (nylon 6,66). The polyamide resin is preferably a crystalline polyamide resin. In this case, the higher the degree of crystallinity, the better the oil resistance. There is no limitation with respect to the softening point and the melting point of the polyamide resin. However, it is preferred that the softening point and the melting point be both 160° to 250° C.

(2) Rubber component

The rubber component used in the present invention comprises a nitrile group-containing rubber and an acrylic rubber. The proportions of the nitrile group-containing rubber and the acrylic rubber are 20 to 80% by weight and 80 to 20% by weight, respectively. When the proportion of the nitrile group-containing rubber is less than 20% by weight and the proportion of the acrylic rubber exceeds 80% by weight, the oil resistance, gasoline resistance and gasohol resistance are insufficient. On the other hand, when the proportion of the nitrile group-containing rubber exceeds 80% by weight and the proportion of the acrylic rubber is less than 20% by weight, the ozone resistance and heat resistance are insufficient.

(a) Nitrile group-containing rubber

Examples of the nitrile group-containing rubber include a copolymer rubber comprising an ethylenically unsaturated nitrile compound and a conjugated diene and optionally a monomer copolymerizable with the ethylenically unsaturated nitrile compound and the conjugated diene. Further, the copolymer rubber may be one in which the conjugated diene units of the copolymer rubber are hydrogenated.

Specific examples of the ethylenically unsaturated nitrile compound include acrylonitrile, α-chloroacrylonitrile, α-fluoroacrylonitrile, and methacrylonitrile. Among them, acrylonitrile is particularly preferable.

Examples of the conjugated diene include butadiene, 2-chlorobutadiene and 2-methylbutadiene. Among them, butadiene is particularly preferable.

Various compounds may be used as the monomer according to need, and examples thereof include alkyl acrylates such as methyl acrylate, ethyl acrylate, n-propyl acrylate, n-butyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decyl acrylate, n-dodecyl acrylate, and n-octadecyl acrylate; alkoxy-substituted alkyl acrylates such as 2-methoxyethyl acrylate, 2-ethoxyethyl acrylate, 2-(n-propoxy)ethyl acrylate, 2-(n-butoxy)ethyl acrylate, 3-methoxypropyl acrylate, 3-ethoxypropyl acrylate, 2-(n-propoxy)propyl acrylate, and 2-(n-butoxy)propyl acrylate; alkyl methacrylates such as methyl methacrylate and octyl methacrylate; alkyl vinyl ketones such as methyl vinyl ketone; vinyl or allyl ether such as vinyl ethyl ether and allyl methyl ether; vinyl aromatic compounds such as styrene, α-methylstyrene, chlorostyrene, and vinyltoluene; carboxyl group-containing compounds such as acrylic acid, methacrylic acid, crotonic acid, 2-pentenoic acid, maleic acid, fumaric acid, and itaconic acid; fluorine containing acrylates such as 1,1-dihydroperfluoroethyl (meth)acrylate, 1,1-dihydroperfluoropropyl (meth)acrylate, 1,1,5-trihydroperfluorohexyl (meth)acrylate, 1,1,2,2-tetrahydroperfluoropropyl (meth)acrylate, 1,1,7-trihydroperfluoroheptyl (meth)acrylate, 1,1-dihydroperfluorooctyl (meth)acrylate, and 1,1-dihydroperfluorodecyl (meth)acrylate; epoxy group-containing compounds such as allyl glycidyl ether, glycidyl methacrylate, and glycidyl acrylate; active halogen-containing compounds such as vinylbenzyl chloride, vinylbenzyl bromide, 2-chloroethyl vinyl ether, vinyl chloroacetate, vinyl chloropropionate, allyl chloroacetate, allyl chloropropionate, 2-chloroethyl acrylate, 2-chloroethyl methacrylate, chloromethyl vinyl ketone, and 2-chloroacetoxymethyl-5-norbornene; hydroxyl group-containing compounds such as 1-hydroxypropyl (meth)acrylate, 2-hydroxypropyl (meth)acrylate, and hydroxyethyl (meth)acrylate; substituted amino group-containing monomers such as dimethylaminoethyl (meth)acrylate, diethylaminoethyl (meth)acrylate, and dibutylaminoethyl (meth)acrylate; vinylamides such as acrylamide, methacrylamide, and N-methylolacrylamide; and ethylene, propylene, vinyl chloride, vinylidene chloride, alkyl fumarate, etc.

The above-described ethylenically unsaturated nitrile compound, conjugated diene, and monomer are usually employed in proportions of 10 to 60% by weight, 15 to 90% by weight, and 0 to 75% by weight, respectively. The above-described copolymer rubber in which the conjugated diene units are hydrogenated has an iodine value (as measured according to JIS K0070) of 120 or less, preferably 60 or less.

This hydrogenated nitrile group-containing rubber can be prepared by hydrogenating, according to an ordinary process (see, e.g., Japanese Patent Application Kokai Publication No. 56-81305), a nitrile rubber prepared by emulsion polymerization, bulk polymerization, or solution polymerization.

(b) Acrylic rubber

This acrylic rubber is a multicomponent copolymer and prepared by polymerizing an alkyl acrylate and/or an alkoxy-substituted alkyl acrylate, a crosslinkable monomer, and optionally other ethylenically unsaturated compound copolymerizable with the alkyl acrylate and/or the alkoxy-substituted alkyl acrylate and the crosslinkable monomer. There is no particular limitation with respect to the composition of the polymer.

The alkyl acrylate is one represented by the following general formula (i):

wherein $R_1$ is an alkyl group having 1 to 18 carbon atoms. Examples of the alkyl acrylate include methyl acrylate, ethyl acrylate, n-propyl acrylate, n-butyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decyl acrylate, n-dodecyl acrylate, and n-octadecyl acrylate. Particularly preferable examples thereof include ethyl acrylate, n-propyl acrylate, n-butyl acrylate, n-pentyl acrylate, n-hexyl acrylate, 2-ethylhexyl acrylate, and n-octyl acrylate.

The alkoxy-substituted alkyl acrylate is one represented by the following general formula (ii):

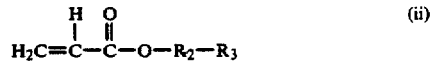

wherein $R_2$ is an alkylene group having 1 to 18 carbon atoms and $R_3$ is an alkyl group having 1 to 18 carbon atoms, and examples thereof include 2-methoxyethyl acrylate, 2-ethoxyethyl acrylate, 2-(n-propoxy)ethyl acrylate, 2-(n-butoxy)ethyl acrylate, 3-methoxypropyl acrylate, 3-ethoxypropyl acrylate, 2-(n-propoxy)propyl acrylate, and 2-(n-butoxy)propyl acrylate.

The crosslinkable monomer is a monomer which can make the copolymer prepared by copolymerization vulcanizable, and examples thereof include at least one compound selected from the group consisting of diene compounds, dihydrodicyclopentadienyl group-containing (meth)acrylates, epoxy group-containing ethylenically unsaturated compounds, active halogen-containing ethylenically unsaturated compounds, and carboxyl group-containing ethylenically unsaturated compounds.

In the above-described crosslinkable monomers, examples of the diene compound include nonconjugated dienes such as alkylidenenorbornene, alkenylnorbornene, dicyclopentadiene, methylcyclopentadiene and a dimer thereof and conjugated dienes such as butadiene and isoprene. Examples of the dihydrodicyclopentadienyl group-containing (meth)acrylate include dihydrodicyclopentadienyl (meth)acrylate and dihydrodicyclopentadienyloxyethyl (meth)acrylate. Examples of the epoxy group-containing ethylenically unsaturated compound include allyl glycidyl ether, glycidyl methacrylate, and glycidyl acrylate. Specific examples of the active halogen-containing ethylenically unsaturated compounds include vinylbenzyl chloride, vinylbenzyl bromide, 2-chloroethyl vinyl ether, vinyl chloroacetate, vinyl chloropropionate, allyl chloroacetate, allyl chloropropionate, 2-chloroethyl acrylate, 2-chloroethyl methacrylate, chloromethyl vinyl ketone, and 2-chloroacetoxymethyl-5-norbornene. Specific examples of the carboxyl group-containing ethylenically unsaturated compound include acrylic acid, methacrylic acid, crotonic acid, 2-pentenoic acid, maleic acid, fumaric acid, and itaconic acid.

The other ethylenically unsaturated compounds may be various compounds depending upon the necessity. Examples of the other ethylenically unsaturated compounds include methacrylates such as methyl methacrylate and octyl methacrylate; cyano-substituted alkyl (meth)acrylates such as 2-cyanoethyl acrylate, 3-cyanopropyl acrylate, and 4-cyanobutyl acrylate; amino-substituted alkyl (meth)acrylates such as diethylaminoethyl acrylate; fluorine-containing acrylates such as 1,1,1-trifluoroethyl acrylate; hydroxyl group-substituted alkyl (meth)acrylates such as hydroxyethyl acrylate; alkyl vinyl ketones such as methyl vinyl ketone; vinyl or allyl ethers such as vinyl ethyl ether and allyl methyl ether; vinyl aromatic compounds such as styrene, α-methylstyrene, chlorostyrene, and vinyltoluene; vinylamides such as acrylamide, methacrylamide, and N-methylolacrylamide; and ethylene, propylene, vinyl chloride, vinylidene chloride, vinyl fluoride, vinylidene fluoride, vinyl acetate, alkyl fumarate, etc.

The composition of the acrylic rubber is not limited and preferably in proportions of 20 to 99.8% by weight of an alkyl acrylate, 20 to 99.8% by weight of an alkoxy-substituted alkyl acrylate, 0.2 to 25% by weight of a crosslinkable monomer, and 0 to 40% by weight of an ethylenically unsaturated compound, respectively.

(3) The thermoplastic and elastomeric composition of the present invention comprises the above-described polyamide resin and the above-described rubber component. The proportions of the polyamide resin and the rubber component may be 25 to 60% by weight and 75 to 40% by weight, respectively. When the proportion of the polyamide resin is less than 25% by weight and the proportion of the rubber component exceeds 75% by weight, not only the gasohol resistance is deteriorated but also the thermoplasticity is lowered, which makes it difficult to conduct molding. On the other hand, when the proportion of the polyamide resin exceeds 60% by weight and the proportion of the rubber component is less than 40% by weight, the rigidity of the composition is increased, so that the elastomeric property is spoiled.

It is preferred that the composition of the present invention comprises (A) 35 to 55% by weight of a polyamide resin and (B) 65 to 45% by weight of a rubber component composed of 40 to 60% by weight of a nitrile group-containing rubber and 60 to 40% by weight of an acrylic rubber.

In the present invention, when the nitrile group-containing rubber in the rubber component contains at least one functional group selected from among a carboxyl group, an epoxy group, a primary, secondary or tertiary amino group and an acid anhydride group in an amount of at least $5 \times 10^{-3}$ molar equivalent per 100 g of the rubber and/or the acrylic rubber contains at least one functional group selected from among a carboxyl group, an acid anhydride group and an epoxy group in an amount of $1 \times 10^{-2}$ molar equivalent per 100 g of the rubber, not only a remarkable improvement in the heat resistance, ozone resistance, oil resistance, gasoline resistance, sour gasoline resistance, gasohol resistance, and sour gasohol resistance but also a remarkable improvement in the performance as a thermoplastic and elastomeric composition, such as tensile strength and elongation, can be attained surprisingly.

(4) In the present invention, it is necessary that the rubber component be dispersed in the polyamide resin in the form of crosslinked rubber particles.

This is because when the rubber component is not dispersed, a tensile strength, an elongation, and a permanent elongation of the composition of the present invention are decreased with the result that a rolling processability and an oil resistance of the composition are deteriorated.

There is no particular limitation with respect to the particle diameter, particle shape and form of dispersion of the crosslinked rubber particles and degree of crosslinking of the dispersed particles. However, in order to attain the object of the present invention, it is preferred that the diameter of the dispersed particle and the degree of crosslinking in terms of the gel content of the dispersed particles be 5 μm or less and 80% or more, respectively. The term "gel content" (solvent insolubles) of the rubber used herein refers to the amount (% by weight) of methyl ethyl ketone insolubles based on that of the whole rubber component.

The rubber component may be dispersed in the polyamide resin by blending of a powdery crosslinked rubber as the rubber component with the polyamide resin or dynamic vulcanization of the rubber component in the presence of a polyamide resin in a molten state.

The blending of the powdery crosslinked rubber may be conducted by blending a polyamide resin in a molten state with a crosslinked rubber powder prepared by seed polymerization of a nitrile group-containing rubber and an acrylic rubber in the presence of a crosslinkable monomer, a crosslinking reaction in emulsion particles by making use of an emulsion of a nitrile-group containing rubber or an acrylic rubber, or vulcanization of the rubber component with kneading.

The dynamic vulcanization is conducted by adding a rubber component in an unvulcanized state to a polyamide resin in a molten state and vulcanizing the rubber component with a vulcanizing agent or through a reaction between the functional groups present in the rubber. In this process, a device which is usually employed in the kneading of a rubber or a resin, for example, an internal kneader or kneader-extruder, such as a Brabender mixer, a Banbury mixer or a kneader, may be used. A high-shear kneader is particularly preferably employed because the diameters of the dispersed particles can be reduced, which makes it possible to impart excellent properties to the resulting composition.

There is no limitation with respect to the vulcanizing agent used in the dynamic vulcanization, and vulcanizing agents commonly used in the vulcanization of a nitrile group-containing rubber and an acrylic rubber may be used. This is true also for the amount of the vulcanizing agent. Examples of the vulcanizing agent include a sulfur vulcanizing agent and an organic peroxide for use in common diene rubbers when the rubber is a nitrile group-containing rubber and a carbon-carbon double bond-containing acrylic copolymer rubber. When an acrylic rubber and a nitrile group-containing rubber are vulcanized by utilizing a functional group contained in the rubber, the vulcanizing agent is selected depending upon the kind of the crosslinkable functional group. For example, when the crosslinkable functional group is an epoxy group, the vulcanizing agent is an organic (carboxylic acid) ammonium salt, an organic phosphonium salt, a dithiocarbamic acid salt, a polyaminecarbamate, a combination of these compounds with a polycarboxylic acid compound, a combination of an alkali metal salt of an organic carboxylic acid with a sulfur compound, or the like. When the crosslinkable functional group is an active halogen group, the vulcanizing agent is an organic (carboxylic acid) ammonium salt, an organic phosphonium salt, a polyaminecarbamate, a combination of an alkali metal salt of an organic carboxylic acid with a sulfur compound, or the like. Further, when the crosslinkable functional group is a carboxyl group, the vulcanizing agent includes a metal oxide, a polyepoxide, a polyisocyanate, a (methylol) phenolic resin, an aziridine, a carbodiimide, or the like.

(5) The properties of the composition of the present invention may be modified by addition of an additive commonly used in the polyamide resin industry and the rubber industry. Examples of the additive include fillers such as carbon black, silica, clay, titanium dioxide, calcium carbonate and pigment, reinforcing agent, zinc oxide, stearic acid, vulcanizing agent, vulcanizing accelerator, antioxidant, stabilizer, lubricant, foaming agent, self-adhesive, adhesive, plasticizer, extender, coupling agent, and discontinuous fibers such as short glass fiber, short cellulose fiber and aramid pulp. It is preferred that the above-described additive be added to a polyamide resin or a rubber prior to dynamic vulcanization to form a master batch.

The present invention will now be described in more detail with reference to the following Examples and Comparative Examples. Unless otherwise specified, "parts" and "%" in the Examples and Comparative Examples are based on weight.

EXAMPLES 1 to 4

An acrylic rubber, a nitrile group-containing rubber, zinc oxide, and sulfur were mixed with each other in respective amounts described in the columns of Examples 1 to 4 of Table 1 to prepare a master batch. Nylon 12 (Daiamid L-1940; a product of Daicel Chemical Industries, Ltd.) was molten in an amount described in the Columns of Examples 1 to 4 of Table 1 in a Brabender mixer which have previously been set at a chamber temperature of 190° C and a number of revolutions of 80 rpm. The above-prepared master batch was fed to the mixer and mixed. Seven minutes after the feeding, dibenzothiazyldisulfide in an amount described in Table 1 was added to the mixture. After an increase in the torque was observed, the mixture was kneaded for 3 min. Then, eicosanedicarboxylic acid was added thereto, and kneading was continued for additional about 5 min. Two minutes before the mixture was taken out of the mixer, Nocrac 224 (antioxidant manufactured by Ouchi Shinko Chemical Industries Co., Ltd.) and N-ethyl-o, p-toluenesulfonamide in respective amounts described in Table 1 were added thereto. The total kneading time was 25 min.

The composition thus prepared was extruded with rolls set at 185° C. to prepare a sheet, followed by evaluation of the thermoplasticity of the composition in terms of the smoothness of the sheet and adhesion to the rolls. Then the sheet was pressed at 205° C. to prepare a sample for evaluation of physical properties.

The tensile test, heat aging test, and oil resistance test were conducted according to JIS K6301. The sour gasohol was evaluated by immersing a specimen at 60° C. in a mixed solution comprising 4% of lauroyl peroxide (LPO) and 96% of a solution comprising JIS fuel oil C. and methanol in a ratio of 80 : 20 (volume ratio) in a hermetically sealed container. The immersion solution was replaced every two days. The specimen was taken out of the immersion solution and evaluated by measurement of percentage volume change and tensile test. The results are shown in Table 2.

COMPARATIVE EXAMPLES 1 to 6

In Comparative Examples 1 to 5, compositions were prepared in the same manner as that of Examples 1 to 4. In Comparative Example 6, nylon-12 was pressed into a sheet. The properties of these products were evaluated. The results are shown in Table 2.

TABLE 1

| results of blending test | Example | | | | Comparative Example | | | | | |
|---|---|---|---|---|---|---|---|---|---|---|
| | 1 | 2 | 3 | 4 | 1 | 2 | 3 | 4 | 5 | 6 |
| nylon-12 | 30 | 40 | 50 | 50 | 20 | 70 | 50 | 50 | 50 | 100 |
| acrylic rubber[1] | 35 | 30 | 25 | 25 | 40 | 15 | 50 | | | |
| nitrile group-containing rubber[2] | 35 | 30 | 25 | | 40 | 15 | | 50 | | |
| nitrile group-containing rubber[3] | | | | 25 | | | | | 50 | |
| zinc oxide | 1.75 | 1.5 | 1.5 | 1.25 | 2.0 | 0.75 | | 2.5 | 2.5 | |
| Nocrac 224 | 1 | 1 | 1 | 1 | 1 | 1 | 1 | 1 | 1 | 1 |
| N-ethyl-o,p-toluenesulfonamide | 5 | 5 | 5 | 5 | 5 | 5 | 5 | 5 | 5 | 5 |
| octadecyltrimethylammonium bromide | | | | | | | 1.0 | | | |
| eicosanedicarboxylic acid | 1.05 | 0.90 | 0.75 | 0.75 | 1.20 | 0.45 | 1.0 | | | |
| dibenzothiazyl disulfide | 0.35 | 0.35 | 0.35 | 0.35 | 0.35 | 0.35 | | 1.0 | 1.0 | |
| sulfur | 0.35 | 0.30 | 0.25 | 0.25 | 0.40 | 0.15 | | 0.5 | 0.5 | |

Note
[1] Nipol AR31 manufactured by Nippon Zeon Co., Ltd.
[2] acrylonitrile-butadiene copolymer rubber manufactured by Nippon Zeon Co., Ltd.; a blend of DN004 (bound acrylonitrile content: 45%) with DN601 (carboxyl group-containing liquid rubber) in a ratio of 98:2
[3] hydrogenation product of an acrylonitrile-butadiene copolymer rubber having a bound acrylonitrile content of 45%; an iodine value of 38

TABLE 2

| results of blending test | Example | | | | Comparative Example | | | | | |
|---|---|---|---|---|---|---|---|---|---|---|
| | 1 | 2 | 3 | 4 | 1 | 2 | 3 | 4 | 5 | 6 |
| tensile test | | | | | | | | | | |
| tensile strength (kg/cm$^2$) | 172 | 193 | 216 | 181 | 126 | 298 | 118 | 91 | 97 | 583 |
| elongation (%) | 170 | 220 | 220 | 180 | 90 | 190 | 60 | 40 | 60 | 330 |
| tension set (%) | 38 | 47 | 54 | 58 | 28 | 86 | immeasurable | immeasurable | immeasurable | 96 |
| heat aging test (135° C. × 4 days) | | | | | | | | | | |
| ΔTB[4] (%) | −20 | −18 | −13 | −9 | −29 | −7 | −6 | −26 | −9 | −7 |
| ΔEB[5] (%) | −35 | −27 | −24 | −16 | −55 | −16 | −33 | −50 | −50 | −15 |

TABLE 2-continued

| results of blending test | Example | | | | Comparative Example | | | | | |
|---|---|---|---|---|---|---|---|---|---|---|
| | 1 | 2 | 3 | 4 | 1 | 2 | 3 | 4 | 5 | 6 |
| oil resistance test | | | | | | | | | | |
| immersion in JIS fuel oil C (60° C. × 2 days) ΔV(6) (%) | 35.3 | 28.7 | 23.1 | 24.8 | 44.6 | 15.5 | 38.4 | 30.5 | 28.0 | 6.0 |
| immersion in JIS fuel oil C/methanol (80/20 volume ratio) (60° C. × 2 days) ΔV (%) | 87.9 | 64.7 | 55.6 | 53.7 | 111.5 | 43.1 | 94.2 | 64.2 | 65.9 | 14.4 |
| immersion in sour JIS fuel oil C/methanol (80/20 volume ratio) (60° C.) | | | | | | | | | | |
| after 4 days ΔV (%) | 88.5 | 65.5 | 56.1 | 55.4 | 107.2 | 44.7 | 95.5 | 68.3 | 67.1 | 15.6 |
| after 4 days ΔTB (%) | −76 | −66 | −60 | −61 | −90 | −46 | −85 | −73 | −75 | −15 |
| after 10 days ΔV (%) | 91.3 | 67.8 | 58.2 | 57.7 | 117.4 | 47.6 | 98.3 | 66.7 | 69.4 | 16.7 |
| after 10 days ΔTB (%) | −80 | −71 | −65 | −63 | −94 | −51 | −89 | −80 | −80 | −17 |
| after 20 days ΔV (%) | 94.0 | 68.3 | 56.3 | 59.4 | 104.0 | 49.3 | 103.1 | 64.0 | 73.5 | 18.3 |
| after 20 days ΔTB (%) | −86 | −74 | −69 | −67 | −97 | −58 | −93 | −91 | −87 | −24 |
| roll processability of composition | excellent | excellent | excellent | excellent | difficult of sheeting | excellent | excellent | excellent | adherent to roll, poor sheet texture | — |

Note:
(4)percentage tensile strength change
(5)percentage elongation change
(6)percentage volume change As is apparent from the comparison of Examples 3 and 4 with Comparative Examples 3 to 5 (having the same nylon content) shown in Tables 1 and 2, Examples in which an acrylic rubber and a nitrile group-containing rubber have been blended with nylon exhibit remarkably improved results of strength, heat aging resistance and oil resistance tests over those of Comparative Examples in which only one of these rubbers has been blended with nylon.

Further, the comparison of Example 1 with Comparative Example 1 reveals that when the proportion of the nylon used is outside (lower limit) the scope of the present invention, no improvement in the results of the strength and oil resistance tests can be attained. Further, as is apparent from Comparative Example 2, when the proportion of nylon used is outside (upper limit) the scope of the present invention, tension set is as large as 86% which raises a problem in the practical use, although the results of the oil resistance test are excellent.

EXAMPLES 5 to 9

Acrylic rubber-1, nitrile group-containing rubber-1, nitrile group-containing rubber-2, zinc oxide, dibenzothiazyl disulfide and sulfur were mixed with each other in proportions shown in the columns of Examples 5 to 9 of Table 3 with low temperature rolls. The mixture was placed in a Brabender mixer to conduct dynamic vulcanization of nitrile group-containing rubber-1 and nitrile group-containing rubber-2. The dynamic vulcanization was conducted under conditions of a chamber temperature of 160° C., a number of revolutions of 100 rpm and a kneading time of 30 min. The dynamic vulcanization rubber composition thus prepared was mixed with acrylic rubber-2 by means of low temperature rolls to prepare a rubber master batch. Into a Brabender mixer which had been set again at a chamber temperature of 200° C. and a number of revolutions of 80 rpm was placed nylon-11 (Rilsan BE SN O TL; a product of Toray Industries, Inc.) in a proportion shown in Table 3, followed by kneading for 3 min to melt nylon-11. Thereafter, the above-prepared rubber master batch was added to the molten nylon-11, followed by mixing for 20 min to conduct dynamic vulcanization of the acrylic rubber (through a reaction of the carboxyl group of acrylic rubber-1 with the epoxy group of acrylic rubber-2). After the completion of the addition of the master batch, the torque was gradually increased and reached the maximum value about 15 min after the addition of the master batch. The occurrence of vulcanization was confirmed by this phenomenon. Thereafter, Nocrac 224 and N-ethyl-N-ethyl-o,p-toluenesulfonamide were added thereto in proportions shown in Table 3 and kneaded for 2 min. The resulting composition was then taken out of the mixer.

The composition thus prepared was molded in the same manner as that of Examples 1 to 4, followed by evaluation of the properties. The results are shown in Table 4.

COMPARATIVE EXAMPLES 7 to 15

In Comparative Examples 7 to 10 and 15, compositions were prepared in the same manner as that of Examples 5 to 9. In Comparative Examples 11 and 12, acrylic rubber-1 and acrylic rubber-2, or nitrile group-containing rubber-1 and nitrile group-containing rubber-2 were added to nylon-11 in a molten state in a Brabender mixer, followed by dynamic vulcanization to prepare a composition. In Comparative Example 13, nylon-11 was pressed into a sheet. Further, in Comparative Example 14, a rubber master batch prepared in the same manner as that of Examples 5 to 9 was press molded into a rubber composition. The properties of these products were evaluated. The results are shown in Table 4. The low temperature embrittlement test was conducted according to JIS K 6301.

TABLE 3

| results of blending test | Example | | | | | Comparative Example | | | | | | | | |
|---|---|---|---|---|---|---|---|---|---|---|---|---|---|---|
| | 5 | 6 | 7 | 8 | 9 | 7 | 8 | 9 | 10 | 11 | 12 | 13 | 14 | 15 |
| blending (parts by weight) | | | | | | | | | | | | | | |
| nylon-11 | 30 | 40 | 50 | 50 | 50 | 20 | 50 | 50 | 70 | 50 | 50 | 100 | | 40 |
| acrylic rubber-1[7] | 24.5 | 21.0 | 10.5 | 17.5 | 24.5 | 28.0 | 3.5 | 31.5 | 10.5 | 35 | | | 35 | 21.0 |
| acrylic rubber-2[8] | 10.5 | 9.0 | 4.5 | 7.5 | 10.5 | 12.0 | 1.5 | 13.5 | 4.5 | 15 | | | 15 | 9.0 |
| nitrile group-containing rubber-1[9] | 24.5 | 21.0 | 24.5 | 17.5 | 10.5 | 28.0 | 31.5 | 3.5 | 10.5 | | 35 | | 35 | 21.0 |
| nitrile group-containing rubber-2[10] | 10.5 | 9.0 | 10.5 | 7.5 | 4.5 | 12.0 | 13.5 | 1.5 | 4.5 | | 15 | | 15. | 9.0 |
| zinc oxide | 5 | 5 | 5 | 5 | 5 | 5 | 5 | 5 | 5 | 5 | 5 | | 5 | 5 |
| Nocrac 224 | 1 | 1 | 1 | 1 | 1 | 1 | 1 | 1 | 1 | 1 | 1 | | 1 | 1 |
| N-ethyl-o,p-toluenesulfonamide | 5 | 5 | 5 | 5 | 5 | 5 | 5 | 5 | 5 | 5 | 5 | 5 | 5 | 5 |
| dibenzothiazyl disulfide | 0.70 | 0.60 | 0.70 | 0.50 | 0.30 | 0.80 | 0.90 | 0.10 | 0.30 | — | 1.00 | — | 2.00 | — |
| sulfur | 0.35 | 0.30 | 0.35 | 0.25 | 0.15 | 0.40 | 0.45 | 0.05 | 0.15 | — | 0.50 | — | 1.00 | — |

Note:
[7] a copolymer rubber comprising 96.7% of ethyl acrylate and 3.3% of methacrylic acid
[8] a copolymer rubber comprising 15.6% of methyl acrylate, 81.2% of ethyl acrylate, and 3.2% of glycidyl methacrylate
[9] a copolymer rubber comprising 47.4% of acrylonitrile and 52.6% of butadiene
[10] a copolymer rubber comprising 42.1% of acrylonitrile, 54.1% of butadiene, and 3.8% of glycidyl methacrylate

TABLE 4

| results of blending test | | Example | | | | | | Comparative Example | | | | | | | |
|---|---|---|---|---|---|---|---|---|---|---|---|---|---|---|---|
| | | 5 | 6 | 7 | 8 | 9 | 7 | 8 | 9 | 10 | 11 | 12 | 13 | 14 | 15 |
| tensile test | | | | | | | | | | | | | | | |
| tensile strength | | 236 | 288 | 261 | 332 | 293 | 146 | 207 | 275 | 367 | 281 | 203 | 456 | 39 | 95 |
| elongation | | 250 | 330 | 290 | 350 | 260 | 230 | 220 | 240 | 260 | 240 | 190 | 60 | 480 | 45 |
| tension set | | 21 | 30 | 48 | 38 | 42 | 9 | 56 | 42 | 74 | 44 | 62 | immeas-urable | 0 | immeas-urable |
| heat aging test (135° C. × 4 days) | | | | | | | | | | | | | | | |
| ΔTB (%) | | −8 | −5 | −6 | −2 | −2 | −21 | −15 | +1 | −7 | +2 | −17 | | −10 | |
| ΔEB (%) | | −20 | −9 | −17 | −14 | −8 | −40 | −41 | −4 | −19 | 0 | −47 | | −26 | |
| oil resistance test | | | | | | | | | | | | | | | |
| immersion in JIS fuel oil C(60° C. × 2 days) | | | | | | | | | | | | | | | |
| ΔV (%) | | 32.5 | 25.0 | 19.3 | 18.1 | 24.1 | 43.6 | 23.3 | 31.9 | 11.8 | 34.7 | 23.7 | 5.2 | 68.5 | |
| immersion in JIS fuel oil C/methanol (80/20 volume ratio)(60° C. × 2 days) | | | | | | | | | | | | | | | |
| ΔV (%) | | 78.1 | 57.8 | 47.7 | 46.3 | 58.4 | 96.5 | 60.6 | 73.3 | 33.3 | 82.6 | 61.3 | 15.1 | 139.1 | |
| immersion in sour JIS fuel oil C/methanol (80/20 volume ratio)(60° C.) | | | | | | | | | | | | | | | |
| after 4 days | ΔV (%) | 79.4 | 59.1 | 50.1 | 47.1 | 58.7 | 95.8 | 61.8 | 75.2 | 33.1 | 83.8 | 63.8 | 21.0 | 143.7 | not tested |
| | ΔTB (%) | −70 | −59 | −50 | −47 | −54 | −81 | −59 | −68 | −33 | −75 | −64 | −14 | −95 | |
| after 10 days | ΔV (%) | 80.5 | 57.6 | 50.4 | 47.9 | 57.3 | 93.6 | 60.2 | 76.0 | 32.4 | 81.4 | 60.4 | 23.4 | 149.1 | |
| | ΔTB (%) | −73 | −61 | −54 | −48 | −56 | −85 | −65 | −70 | −37 | −75 | −73 | −21 | −97 | |
| after 20 days | ΔV (%) | 78.7 | 59.2 | 48.5 | 46.4 | 59.6 | 90.2 | 58.5 | 73.9 | 33.7 | 84.1 | 56.9 | 31.7 | 136.5 | |
| | ΔTB (%) | −80 | −67 | −64 | −53 | −59 | −88 | −75 | −73 | −44 | −78 | −83 | −33 | −97 | |
| low temperature embrittlement test | | | | | | | | | | | | | | | |
| brittle temperature (°C.) | | −26 | −33 | −32 | −37 | −35 | −18 | −24 | −31 | −39 | −31 | −22 | −43 | −13 | |
| roll processability of composition | | excel-lent | excel-lent | excel-lent | excel-lent | excel-lent | difficult of sheeting | poor in surface of roll adhesive sheet | excel-lent | excel-lent | excel-lent | adherent to roll, poor sheet texture | | | adherent to roll, failed in sheeting |

In Tables 3 and 4, the comparison of Examples 7 to 9 in which the proportion of nylon is the same and the proportions of the acrylic rubber and nitrile group-containing rubber fall within the scope of the present invention with Comparative Examples 8 and 9 in which the proportions of the above-described two kinds of rubbers are outside the scope of the present invention reveals that the composition of the present invention exhibits excellent results in the oil resistance test. The comparison of Example 5 with Comparative Example 7 reveals that when the proportion of the nylon used is outside (lower limit) the scope of the present invention, not only the roll processability but also the results of the oil resistance test are remarkably poor. In the case of Comparative Examples 10 wherein the proportion of nylon used is outside (upper limit) the scope of the present invention, tension set is large although the results of the oil resistance test are excellent, which raises a problem in the practical use. In the case of Comparative Examples 15 wherein only acrylic rubber had been subjected to dynamic vulcanization, the adhesion to the roll was so significant that sheeting was that the sheet could not be possible. Further, the strength was also poor, which renders the composition unsuitable for practical use.

EXAMPLES 10 AND COMPARATIVE EXAMPLES 16 AND 17

Nylon-11, acrylic rubber (11), and each nitrile group-containing rubber were placed in proportions described in Table 5 in a Brabender mixer set at a chamber temperature of 190° C. and a number of revolutions of 100 rpm and kneaded with each other for 5 min, followed by addition of zinc oxide and sulfur in proportions described in Table 5. After the addition was completed and the torque reached the maximum value, the mixture was kneaded for about 5 min. Then, acrylic rubber (12) was added thereto, followed by kneading for about 15 min. Finally, Nocrac 224 and N-ethyl-o,p-toluenesulfonamide was added, and the mixture was kneaded for about 2 min. The resulting composition was taken out of the mixer. Thereafter, the composition was molded in the same manner as that of Examples 1 to 4. The properties of the moldings thus prepared were evaluated. The results are shown in Table 5.

TABLE 5

| results of blending test | Comp. Ex. 16 | Ex. 10 | Comp. Ex. 17 |
|---|---|---|---|
| blending (parts by weight) | | | |
| nylon-11 | 20 | 50 | 70 |
| acrylic rubber[11] | 12.0 | 7.5 | 4.5 |
| acrylic rubber[12] | 28.0 | 17.5 | 10.5 |
| nitrile group-containing rubber[13] | 24.0 | 15.0 | 9.0 |
| nitrile group-containing rubber[14] | 8.0 | 5.0 | 3.0 |
| nitrile group-containing rubber[15] | 8.0 | 5.0 | 3.0 |
| zinc oxide | 5 | 5 | 5 |
| Nocrac 224 | 1 | 1 | 1 |
| N-ethyl-o,p-toluenesulfonamide | 5 | 5 | 5 |
| sulfur | 0.8 | 0.5 | 0.3 |
| tensile test | | | |
| tensile strength (kg/cm²) | 132 | 314 | 350 |
| elongation (%) | 220 | 330 | 260 |
| tension set (%) | 11 | 42 | 77 |
| oil resistance test | | | |
| immersion in JIS fuel oil C (60° C. × 2 days) ΔV (%) | 45.0 | 19.9 | 10.6 |
| immersion in JIS fuel oil C/methanol (80/20 volume ratio) (60° C. × 2 days) ΔV (%) | 99.7 | 48.4 | 33.5 |

TABLE 5-continued

| results of blending test | Comp. Ex. 16 | Ex. 10 | Comp. Ex. 17 |
|---|---|---|---|
| immersion in sour JIS fuel oil C/methanol (80/20 volume ratio) (60° C.) | | | |
| after 4 days ΔV (%) | 99.4 | 49.1 | 34.7 |
| after 4 days ΔTB (%) | −84 | −45 | −36 |
| after 10 days ΔV (%) | 102.3 | 48.2 | 35.8 |
| after 10 days ΔTB (%) | −87 | −45 | −40 |
| after 20 days ΔV (%) | 104.1 | 51.3 | 34.0 |
| after 20 days ΔTB (%) | −90 | −49 | −45 |

Note:
[11]the same as (1) of Table 1
[12]a copolymer composition comprising 98.5% of ethyl acrylate and 1.5% of allyl glycidyl ether
[13]the same as (3) of Table 1
[14]a hydrogenation product of a copolymer rubber comprising 46.3% of acrylonitrile, 49.8% of butadiene, and 3.9% of N,N-diethylaminoethyl acrylate; an iodine value of 22.3
[15]a maleic anhydride-modified hydrogenated nitrile rubber prepared by reacting a solution comprising 100 parts of the nitrile group-containing rubber described in the above item [13], 50 parts of maleic anhydride, 4 parts of benzoyl peroxide and 2,000 parts of methyl ethyl ketone at 95° C. for 5 hr and purifying the reaction product through reprecipitation; an amount of addition of acid of $0.78 \times 10^{-2}$ molar equivalents per 100 g of the rubber Thus, according to the present invention, there is provided a thermoplastic and elastomeric composition improved in mechanical properties, heat resistance, ozone resistance, oil resistance, gasoline resistance, sour gasoline resistance, gasohol resistance, sour gasohol resistance, and thermoplastic moldability over the composition of the prior art.

The thermoplastic and elastomeric composition of the present invention is suitable for use in applications such as flexible parts requiring heat resistance, ozone resistance, oil resistance, etc., for example, hoses, seals, gaskets and packings, belts, boots, rolls, gears, and the above-described and other various parts being in contact with particularly gasoline, alcohol-mixed gasoline, etc. The above-described articles comprising the composition of the present invention can be prepared by an ordinary process for preparing a thermoplastic resin elastomer, such as extrusion molding, injection molding, blow molding, or compression molding.

We claim:

1. A thermoplastic and elastomeric composition comprising 25 to 60% by weight of a polyamide resin and 75 to 40% by weight of a rubber component; said rubber component comprising 20 to 80% by weight of a hydrogenated nitrile group-containing rubber and 80 to 20% by weight of an acrylic rubber, said rubber component being dispersed in the form of crosslinked particles in said polyamide resin; said hydrogenated nitrile group-containing rubber being a hydrogenated copolymer containing 10 to 60% by weight of a vinyl nitrile, 15 to 90% by weight of a conjugated diene and 0 to 75% by weight of a monomer copolymerizable with vinyl nitrile and said conjugated diene, said hydrogenated nitrile-group containing rubber having an iodine value of 120 or less; said acrylic rubber being a copolymer of at least one acrylate selected from the group consisting of an alkyl acetate and an alkoxy-substituted alkyl acrylate with at least one compound selected from the group consisting of a nonconjugated diene, a conjugated diene, a dihydrodicyclopentadienyl group-containing (meth)acrylate, an epoxy group-containing ethylenically unsaturated compound, an active halogen-containing ethylenically unsaturated compound and a carboxyl group-containing ethylenically unsaturated compound.

2. A thermoplastic and elastomeric composition according to claim 15, wherein said polyamide resin has a melting point of 160° C. to 250° C.

3. A thermoplastic and elastomeric composition according to claim 1, wherein said hydrogenated nitrile group-containing rubber contains at least one functional group selected from the class consisting of a carboxyl group, an epoxy group, and a primary, secondary or tertiary amino group, in an amount of at least $5 \times 10^{-3}$ molar equivalents per 100 g of the rubber.

4. A thermoplastic and elastomeric composition according to claim 1, wherein said acrylic rubber contains at least one functional group selected from the class consisting of a carboxyl group and an epoxy group, in an amount of at least $1 \times 10^{-2}$ molar equivalents per 100 g of the rubber.

5. A thermoplastic and elastomeric composition according to claim 1, wherein said crosslinked rubber particles have a diameter of 5 μm or less.

6. A thermoplastic and elastomeric composition according to claim 1, wherein said crosslinked rubber particle has a methyl ethyl ketone insoluble content of 80% by weight based on the amount of the whole rubber component.

* * * * *